United States Patent
Bayart et al.

(10) Patent No.: US 6,778,562 B2
(45) Date of Patent: Aug. 17, 2004

(54) OPTICAL COUPLER FOR A MULTIMODE PUMP

(75) Inventors: Dominique Bayart, Clamart (FR); Laurent Berthelot, Orsay (FR)

(73) Assignee: Alcatel, Paris (FR)

( * ) Notice: Subject to any disclaimer, the term of this patent is extended or adjusted under 35 U.S.C. 154(b) by 46 days.

(21) Appl. No.: 10/330,331

(22) Filed: Dec. 30, 2002

(65) Prior Publication Data

US 2003/0128723 A1 Jul. 10, 2003

(30) Foreign Application Priority Data

Jan. 3, 2002 (FR) .......................................... 02 00 045

(51) Int. Cl.⁷ .............................. H01S 3/30; G02B 6/02
(52) U.S. Cl. .......................................... 372/6; 385/125
(58) Field of Search .............................. 372/6; 385/125, 385/123, 30, 40, 48

(56) References Cited

U.S. PATENT DOCUMENTS

| | | | |
|---|---|---|---|
| 5,170,458 A | | 12/1992 | Aoyagi et al. |
| 5,361,383 A | * | 11/1994 | Chang et al. .................. 385/27 |
| 6,097,870 A | * | 8/2000 | Ranka et al. ................ 385/127 |
| 6,301,420 B1 | * | 10/2001 | Greenaway et al. ......... 385/126 |
| 6,334,019 B1 | * | 12/2001 | Birks et al. .................. 385/125 |
| 6,445,862 B1 | * | 9/2002 | Fajardo et al. ............... 385/125 |
| 6,512,871 B2 | * | 1/2003 | Kumel et al. ................ 385/123 |
| 6,522,820 B2 | * | 2/2003 | Wang .......................... 385/125 |
| 6,594,429 B1 | * | 7/2003 | White .......................... 385/124 |
| 6,608,955 B2 | * | 8/2003 | Fukuda et al. ............... 385/125 |
| 6,625,364 B2 | * | 9/2003 | Johnson et al. .............. 385/127 |
| 6,631,234 B1 | * | 10/2003 | Russell et al. ............... 385/125 |
| 6,654,522 B2 | * | 11/2003 | Chandalia et al. ............ 385/48 |
| 6,661,949 B1 | * | 12/2003 | James et al. .................... 385/30 |
| 2002/0070359 A1 | * | 6/2002 | Kai et al. ................ 250/504 R |
| 2002/0071457 A1 | * | 6/2002 | Hogan .......................... 372/23 |
| 2002/0102081 A1 | * | 8/2002 | Voevodkin ................... 385/123 |
| 2002/0114574 A1 | * | 8/2002 | Chandalia et al. ............. 385/48 |
| 2003/0031434 A1 | * | 2/2003 | Fajardo et al. ............... 385/115 |
| 2003/0087505 A1 | * | 5/2003 | Deane ........................ 438/422 |
| 2003/0113074 A1 | * | 6/2003 | Kohlstadt et al. .............. 385/92 |
| 2003/0174961 A1 | * | 9/2003 | Hamada ....................... 385/48 |

FOREIGN PATENT DOCUMENTS

| | | |
|---|---|---|
| EP | 0497243 A2 | 8/1992 |
| WO | WO 9829768 | 7/1998 |
| WO | WO 9945419 | 9/1999 |
| WO | WO 0049435 | 8/2000 |
| WO | WO 0060390 | 10/2000 |

OTHER PUBLICATIONS

G. Kakarantzas et al, "Directional coupling in a twin core photonic crystal fiber using heat treatment", Technical Digest. Summaries of Papers Presented at the Quantum Electronics and Laser Science Conference. Postconference Technical Digest (IEEE Cat. No. 01CH37172), pp. 125–126, XP002215557, 2001.

B. Ha Lee et al, "Photonic Crystal Fiber Coupler", Optics Letters, May 15, 2002, Opt. Soc. America, USA, vol. 27, No. 10, pp. 812–814, XP002215558.

* cited by examiner

Primary Examiner—Leon Scott, Jr.
(74) Attorney, Agent, or Firm—Sughrue Mion, PLLC

(57) ABSTRACT

The invention concerns an optical coupler formed of a photonic optical fiber (2) assembled by melting and stretching with at least one multimode optical fiber (4, 6). The phototonic fiber can be used to inject or extract a signal, whereas the multimode fibers can be used to inject pump light.

The invention is able to in particular effectively couple multimode pumps in a laser cavity formed by a double cladding fiber. In this case, the optical fiber is not used to inject a signal, but to provide the coupler with a digital opening and a diameter adapted to those of the cavity. The invention is also able to couple one or several multimode pumps in a double cladding fiber. In this case, this makes it possible to retain in the coupler for the signal transmitted through the photonic fiber a mode diameter greater than or equal to the mode diameter at the inlet or outlet of the coupler.

17 Claims, 1 Drawing Sheet

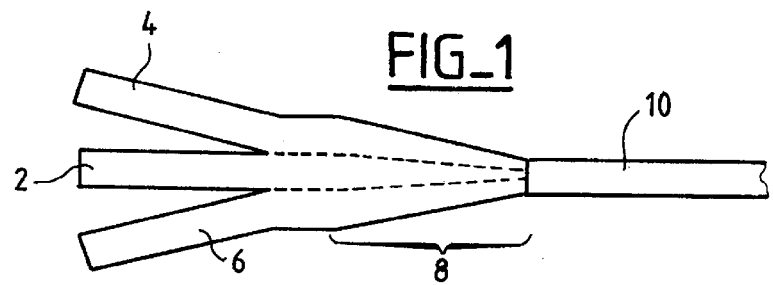
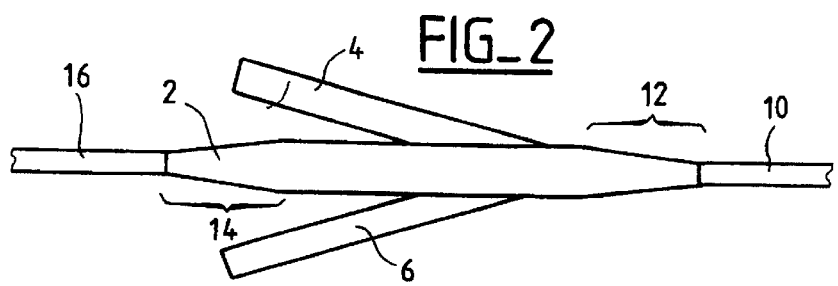
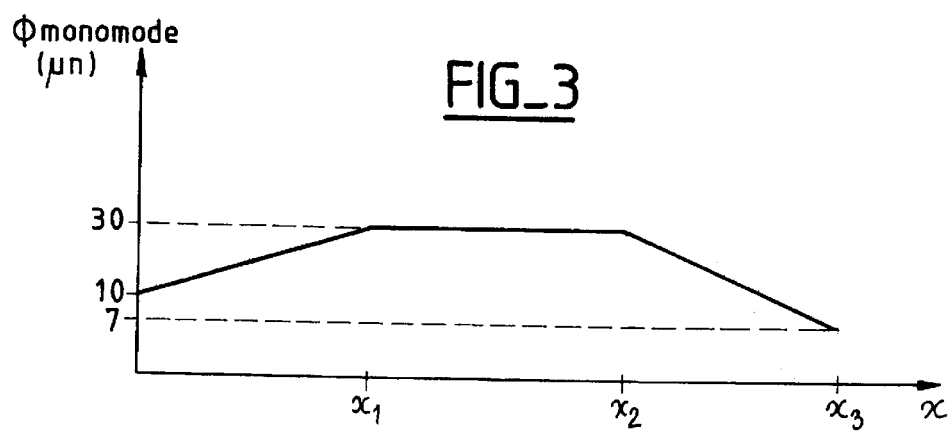
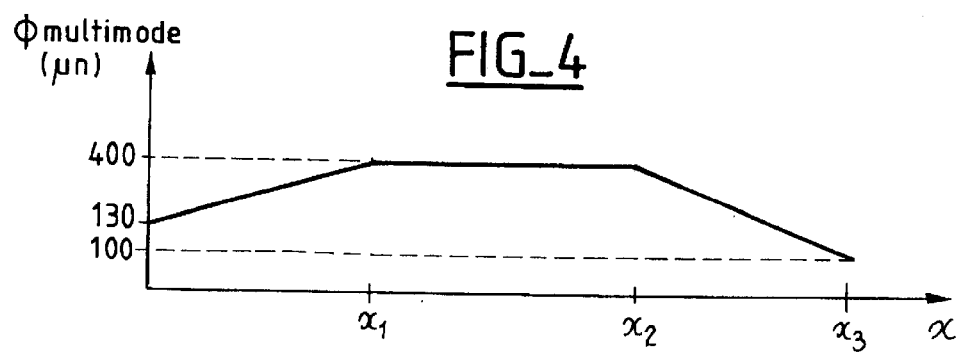

OPTICAL COUPLER FOR A MULTIMODE PUMP

The present invention concerns optical fibre transmissions and more specifically a coupler for a multimode pump.

Recently, "photonic" fibres have appeared on the market, these fibres known as "photonic crystal fibres" (PCF). Like conventional fibres, these fibres are not fully constituted by a solid transparent material, such as doped silicon. Shown as a section, a photonic fibre exhibits a plurality of air holes. These holes are parallel to the axis of the fibre and extend longitudinally along the fibre. In practice, these holes can be obtained by producing the preform by assembling silicon cylinders or capillary tubes whilst observing the pattern of the holes to be obtained in the fibre. Stretching this preform provides a fibre with holes corresponding to the capillary tubes.

The presence of these holes in the material of the fibre creates average index variations of the material. As in a conventional optical fibre, these index variations can be used to guide light signals with adapted wavelengths. A description of these photonic fibres is provided in the document WO-A-00 49 435. This document, apart from showing the operating principle of the photonic fibres, also describes a directional coupler or ray separator. This coupler is formed by heating and stretching two photonic fibres. The stretched areas of the two photonic fibres are welded during heating or during a subsequent heating stage. The light propagating in one of the fibres is then coupled into another fibre. This document also proposes assembling a photonic fibre with a conventional fibre, that is a fibre without any holes, the photonic fibre then being stretched and coupled into the stretched zone. Stretching of the photonic fibre recloses the holes of the fibre so that there are no longer any holes close to the cut. The conventional fibre—according to the figure a cladded core fibre—is also stretched and cut so as to have a size identical to the size of the stretched photonic fibre. The two fibres are assembled end-to-end. The mode diameter extends over the entire fibre in the stretched areas in the shape of a cone. In the non-stretched portion of the photonic fibre or conventional fibre, the light propagates normally. Finally, this document indicates that the local stretching of a multi-core photonic fibre makes it possible to create a local directional coupler. In fact, the stretching of the fibre provokes a partial closing of the holes and an interaction between the lights of the various cores.

The document EP-A-1 043 816 describes a double clad fibre. The signal is transmitted into the doped core of the fibre and a pump is injected into the first cladding. So as to direct the light of the pump towards the doped core, regions with a modified index are provided in the first cladding. These modified index regions can in particular be constituted by air holes. Nothing in this document indicates how the pump is coupled in the cladding of the fibre.

The document EP-A-893 862 describes a bundle of fibres having six pump injection multimode fibres surrounding a monomode fibre for the signal. The fibres are assembled by melting and stretching so as to reduce the diameter of the six injection fibres and the monomode fibre to the size of the core of a double cladding fibre. The bundle obtained is cut and coupled end-to-end to the double cladding fibre. The injection fibres are multimode fibres having a digital opening smaller than that of the double cladding pumping fibre. The monomode fibre is a clad core fibre which is used for injection of the signal to be amplified in the double cladding fibre or for extracting the signal from this fibre. The mode diameter in the monomode fibre is a decreasing and then increasing function of the core diameter. Thus, it is possible to select for the monomode fibre a core diameter after melting and stretching, which ensures the same mode diameter at the inlet and outlet of the monomode fibre.

This solution limits the degrees of freedom concerning the design of the system. In fact, the core diameters at the two extremities of the coupler are linked. This can render production more complex. In addition, the solution requires that the mode diameter decreases and then increases when the stretched portion of the monomode fibre is traversed, which can cause problems. Finally, the monomode nature of the fibre for high values of the core diameter is not necessarily ensured.

With respect to the above information, the problem concerned by the invention is to simplify the production of this coupler and also simplify management of the optical characteristics of the coupler along the path followed by the signal.

More specifically, the invention concerns an optical coupler having:
  a photonic optical fibre having a stretched portion;
  at least one multimode optical fibre coupled to the photonic optical fibre.

In one embodiment, the photonic optical fibre is at the centre of assembling with the multimode optical fibres. The photonic optical fibre can be assembled with the multimode optical fibre(s) by melting, stretching or even be assembled with the multimode optical fibres outside the stretched portion.

The photonic fibre can also be an amplifying fibre. In one embodiment, the photonic fibre is a multimode fibre. It is then advantageous that it possesses in a non-stretched state a multimode core diameter greater than or equal to 100 micrometers. In another embodiment, the photonic fibre is a double cladding fibre. In this case, it is preferable that it has in a non-stretched state a multimode core diameter greater than or equal to 100 micrometers and/or a mode diameter for the monomode core larger than or equal to 15 micrometers.

The photonic optical fibre can also have a second stretched portion at its extremity opposite the stretched portion.

The invention also concerns a fibre laser having:
  this coupler as described above with a multimode photonic fibre;
  a laser cavity formed of an optical fibre connected to the stretched extremity of the photonic fibre of the coupler;
  at least one multimode pump connected at the inlet of a multimode optical fibre of the coupler.

Advantageously, the difference between the diameter of the multimode core of the photonic fibre and the diameter of the multimode core of the laser cavity is less than or equal to 5%.

The invention further concerns an optical amplifier having:
  the above-mentioned coupler with a double cladding photonic fibre
  a multiple cladding amplifying optical fibre coupled to the stretched extremity of the coupler.

In this case, it is advantageous that the difference between the mode diameter of the monomode core of the multiple cladding optical fibre and the mode diameter of the monomode core of the photonic fibre is less than or equal to 5%. It is also possible to ensure that the difference between the diameter of the multimode core of the multiple cladding optical fibre and the diameter of the multimode core of the photonic fibre is less than or equal to 5%.

In one embodiment, the amplifier has a second coupler of the same type, the extremity of the multiple cladding fibre opposite the first coupler being coupled to the stretched extremity of the second coupler.

Other characteristics and advantages of the invention shall appear on a reading of the following description of embodiments of the invention given by way of example and with reference to the accompanying drawings which show FIG. 1 is a diagrammatic representation of an optical coupler according to one embodiment of the invention;

FIG. 2 is a diagrammatic representation of an optical coupler according to another embodiment of the invention FIGS. 3 and 4 are graphs showing the mode diameter of the monomode core and the diameter of the multimode core in the coupler of FIG. 2.

So as to embody an optical coupler, the invention proposes to assemble one photonic optical fibre and at least one multimode optical fibre. The photonic fibre can be a multimode optical fibre or a double cladding fibre. In a first embodiment, the photonic fibre is a multimode fibre and in this case the coupler is particularly adapted to be used for the injection of multimode pumps, for example into a laser cavity formed of a double cladding fibre. In this first embodiment, the photonic fibre is not used to inject a signal, but ensures that the coupler is fully adapted to the laser cavity in terms of digital opening and diameters.

In a second embodiment, the photonic fibre is a double cladding fibre and here the coupler is then particularly adapted to be used as a multiplexer, for example for injecting a signal and multimode pumps into a doped double cladding amplification fibre. The monomode core of the photonic fibre is then used to inject the signal to the amplifier (or extract the amplified signal), whereas the multimode core of the photonic fibre is used to inject multimode pumps.

In either of the above cases, the coupler can be embodied by means of melting and stretching or via the coupling of fibres and stretching. The stretched portion with a conical shape can, as in the document EP-A-893 862, correspond to the site for assembling the fibres of the coupler, this embodiment being that of FIG. 1. It is also possible to firstly separate the coupling of the multimode fibres and the photonic fibre, and secondly stretch the fibre and in this case, only the photonic fibre is stretched, this embodiment being shown on FIG. 2.

As indicated earlier, the photonic fibre is understood to be a fibre which is not, like conventional fibres, fully constituted by a solid transparent material such as doped silicon, and when shown as a section, this photonic fibre has a plurality of air holes or hole of another gas, even a vacuum. These holes are parallel to the axis of the fibre and extend longitudinally along the fibre. These holes, as indicated in the french application filed by the Applicant on 16.03.01 under the number 01 03639 and entitled "Photonic optical fibre having a large working surface", have the effect of inducing in the fibre local variations of the index, these variations, like the variations induced in the fibre by doping agents, contribute in guiding the light in the fibre.

FIG. 1 shows a diagrammatic representation of an optical coupler according to the first embodiment of the invention. In this embodiment, the coupler is adapted to coupling in the outlet fibre 10 of multimode pumps. The photonic fibre is multimode, i.e. is able to transmit light according to several modes and may possibly have a monomode core. The coupler is formed of the multimode photonic optical fibre 2 which is assembled to at least one multimode optical fibre. In the example of the figure, two multimode optical fibres 4 and 6 are represented. It is possible to use only a single multimode optical fibre. On the other hand, as indicated in the document EP-A-0 893 862, it is possible to use six multimode optical fibres distributed around the photonic fibre. The choice of the number of multimode optical fibres depends on the characteristics of the fibres, the nature of the light to be coupled and the envisaged applications.

The photonic optical fibre 2 and the multimode fibres are assembled by melting and are then stretched so as to form a conical portion 8. In the assembly, the photonic optical fibre remains at the centre. This assembling mode corresponds to the one appearing in the document EP-A-0 893 862. It is also possible to couple the multimode fibres to the photonic fibre by lateral coupling techniques described in the documents WO-A-95 10868, WO-A-95 10869 or WO-A-96 20519 so that the light injected into the multimode fibres is coupled inside the photonic fibre. The conical portion would then be separate from the portion in which the fibres are coupled. In this case, the conical portion would simply correspond to a reduction of the diameter of the photonic fibre accompanied, if appropriate, of a disappearance of the holes from the fibres.

In either case, the formation of the cone makes it possible to cut assembling stretched to a multimode core diameter corresponding to the diameter of the multimode core of the fibre 10 to which the coupler is connected. The difference of the multimode diameters is preferably smaller than 5%. This fibre 10 may be a double cladding fibre used as a laser cavity. A double cladding fibre is understood here to be a known type of fibre having a first core adapted in such a way as to ensure propagation according to a single mode of a light, and a second core adapted to ensure propagation of the light according to various modes. Thus, the fibre can result in the monomode core having a signal or monomode light and simultaneously result in the multimode core of the pump light. The diameter mode for the monomode core is typically 5 micrometers and the diameter of the multimode core is typically 200 micrometers. Such a fibre can be obtained by selecting index profile with two steps: the first step or index jump ensures confinement of the monomode light whereas the second step ensures confinement of the monomode light.

The stretching of the photonic fibre—together with the multimode fibres if appropriate—makes it possible to adapt the multimode core diameter and the digital opening at the outlet of the coupler. Initially, the photonic fibre has a large multimode core diameter and a large digital opening. Thus, this adaptation remains possible, even if the stretching of the fibre and the corresponding reduction of diameter lead to a reduction of the multimode core diameter and of the digital opening. The use of a photonic fibre makes it possible to retain good coupling with the fibre 10 placed at the coupler outlet. The difference between the multimode core diameters of the photonic fibre and the fibre forming the laser cavity is preferably smaller than 5%. The extraction of the laser signal is effected by known means via the extremity of the cavity opposite the coupler, the injection of the signal being effected via the extremity of the cavity connected to the coupler. It is also possible to have the coupler in the laser cavity in which case the photonic fibre of the coupler forms part of the cavity and in this case it may be advantageous to have the photonic fibre doped.

By way of example, in the case of a coupler outside the laser cavity, it is possible for the fibre forming the laser cavity to use a double cladding fibre having a multimode core diameter of 200 micrometers and a digital opening of 0.45. As a photonic fibre, it is possible to use a fibre of the type indicated in said French patent application, namely multimode and not necessarily having a monomode core and prior to stretching having a core diameter of about 600 micrometers and a digital opening of 0.16. The stretching of this fibre brings the core diameter to 200 micrometers and the digital opening to 0.45.

In the case of a coupler placed in the cavity, it is possible to use the same fibre for the cavity. As a photonic fibre, it is possible to use the same fibre or even a doped fibre of the type described in the French patent application filed by the Applicant on 16.03.01 under the number 01 03640 and entitled "Double cladding photonic optical fibre". It is then possible to provide a second conical or tapered portion at the other extremity of the coupler so as to connect this other extremity to the laser cavity.

In the example of a coupler used for pumping multimode pumps into a laser cavity, the use of a photonic fibre makes it possible to increase the degrees of freedom concerning the design of the system, especially when selecting mode diameters and digital openings.

FIG. 2 shows another embodiment of the invention. In this embodiment, the coupler is used as a multiplexer and the photonic fibre is used to inject a signal. It is then advantageous for the photonic fibre to be a double cladding fibre, the monomode core being used to inject (or extract) the signal, whereas the multimode lights are coupled by the fibres assembled in the multimode core of the photonic fibre. The use of a photonic fibre in this embodiment has the following advantages. Before stretching, the photonic fibre has a large mode diameter for the monomode core which may reach 30 micrometers, and a multimode core diameter which may reach 400 micrometers or more. After stretching of the fibre, so as to bring the multimode core diameter to 100 micrometers, the mode diameter of the monomode core is reduced to 7 micrometers in the same proportions. The digital opening is increased by an inverse factor and can reach values of between 0.3 and 0.6 at the outlet of the conical portion.

The mode diameter of the monomode core of the stretched fibre is then approximately identical to the mode diameter of a fibre mounted at the outlet of the coupler of the invention. The difference of the mode diameters is preferably less than 5%. Thus, the invention allows good adaptation at the outlet of the coupler for the monomode signal. This characteristic is linked to the presence of holes in the fibre which contribute in confining the monomode light in the monomode core despite the large dimensions of this core.

Moreover, the photonic fibre also has a multimode core with large dimensions prior to stretching. After stretching, the multimode core can have a diameter compatible with that of the fibre mounted at the outlet of the coupler. The difference of the multimode core diameters is again advantageously lower than 5%.

The coupler of FIG. 2 is similar to that of FIG. 1. However, the assembling of fibres in the coupler of FIG. 2 is carried out some distance away from the conical portion 12 of the photonic fibre. In addition, the photonic fibre is used for injecting the signal and thus has at its extremity corresponding to the inlet of the coupler a stretched portion 14. Stretching makes it possible to reduce the mode diameter of the monomode core of the photonic fibre so as to adapt it to the mode diameter of the fibre 16 connected to the inlet of the coupler so as to inject the signal. In the example of an SMF fibre, the mode diameter could be about 10 micrometers. This value can be reached for the mode diameter of the monomode core of the photonic fibre by reducing the external diameter of the photonic fibre. It can be readily understood in this case that for injecting the signal, the diameter of the multimode core of the photonic fibre is unaffected.

As when allowing adaptation at the outlet of the coupler, the use of a photonic fibre thus makes it possible to be adapted at the inlet of the coupler, this photonic fibre also having a monomode core over its entire length, even in the non-stretched portion.

There follows examples of amplifiers constructed from a coupler of the type shown on FIG. 2. In the first example, the photonic fibre is doped and provides amplification. It is then possible to connect each extremity of the coupler to SMF fibres having a core diameter of about 10 micrometers. For the photonic fibre, a fibre is used of the type described in the application 01 03640. If appropriate, the length of the photonic fibre is increased. Before stretching, the fibre has a multimode core diameter of 500 micrometers and after stretching a multimode core diameter of 125 micrometers without being affected. The monomode core diameter moves from 40 to 10 micrometers which allows adaptation to the SMF fibre. It is possible to use four multimode fibres with a core diameter of 100 micrometers and which couple the pumps in the photonic fibre.

In a second example, the multiplexer is separate from the amplification fibre. In this case, it is possible to use the photonic fibre of the application number 01 03639, said fibre not being doped. The photonic fibre can have a multimode core diameter of 400 micrometers and a mode diameter of the monomode core of 30 micrometers. At the inlet, the photonic fibre is stretched so as to have a monomode core mode diameter of about 10 micrometers, like the SMF fibre providing the signal. At the outlet, the photonic fibre is stretched so as to have a monomode core mode diameter of about 7 micrometers. The multimode core diameter reduces to 100 micrometers and the digital opening changes from 0.15 to 0.6. The coupler is thus adapted at the output to an amplification fibre having these digital opening and core diameter values. It is possible to use the same pumps as in the preceding example.

In a third example, a photonic fibre of the same type as that in the second example is used, but with a multimode core diameter of 100 micrometers, a monomode core mode diameter of 14 or 15 micrometers and a digital opening of 0.15. Two pumps are used, each having a multimode core diameter of 50 micrometers with a digital opening of 0.15. At the outlet, the photonic fibre is stretched so as to have a monomode core diameter of about 7 micrometers, the multimode core diameter changes to 50 micrometers and the digital opening changes from 0.15 to 0.22. Compared with the second, this example has the advantage of making it possible to use more than one pump whilst having a small digital opening at the outlet. The amplification fibre can be a fibre having no low index polymer coating (of the type making it possible to increase the digital opening) but at the expense of the mechanical properties).

More generally, it is possible to use the following equation so as to determine the inlet and outlet diameters according to the number of multimode fibres. The inlet and outlet multimode diameters are marked $d_1$ and $d_2$, the digital openings given the references NA1 and NA2 and the number of multimode fibres is marked n. The term "inlet" refers to the characteristics of the photonic fibre prior to coupling with the mulitmode fibres and the term "outlet" refers to the characteristics of this photonic fibre after coupling with the multimode fibres. Thus one has:

$$(d_2 NA_2/d_1 NA_1)^2 = n$$

which in the example of eight fibres with identical outlet and inlet multimode core diameters showing that the digital opening of 0.12 at the inlet becomes 0.34 at the outlet.

The use of a photonic fibre makes it possible to retain along the stretched portion propagation characteristics which are as advantageous as those present at the inlet and outlet of the coupler. From a qualitative point of view, the stretching of the photonic fibre results in a homothetic reduction of the size of the holes present in the fibre, indeed their complete disappearance. If the photonic fibre initially has a large mode diameter, the mode diameter in the coupler decreases in the conical zone but still remains larger than the mode diameter at the outlet of the coupler.

To this effect, reference can be made to FIG. 4 of the document EP-A-O 893 862. This figure shows that the mode diameter is a decreasing and then increasing function of the core diameter of a stretched fibre. This document suggest selecting stretching so that the mode diameter of the stretched fibre is equal to the mode diameter of the fibre prior to stretching. This corresponds to the horizontal projection on the graph of the mode diameter according to the core diameter of a horizontal line cutting the curve at two points. Conversely, the invention suggests selecting a photonic fibre with a mode diameter in an non-stretched state so that it is able to remain inside the coupler in the increasing portion of the function associating the mode diameter with the core diameter. Thus, the mode diameter reduces in the conical portion and reaches a minimum value at the outlet point of the coupler. However, as regards the entire coupler, it remains greater than this value. The photonic fibre in addition has a monomode core over its entire length.

The photonic fibre is advantageously selected so as to have a multimode core diameter of at least 100 micrometers prior to stretching. This value ensures that stretching results in obtaining multimode core diameter values compatible with the fibres connected to the coupler. If the photonic fibre is a double cladding fibre, it is also advantageous that it has a monomode core diameter of at least 15 micrometers, which ensures that stretching results in having monomode core diameters compatible with the fibres connected to the coupler.

FIGS. 3 and 4 are graphs respectively showing the mode diameter of the monomode core and the diameter of the multimode core in the second example of FIG. 2. The distance along the coupler is laid off as abscissa in mm and the mode diameter or the multimode core diameter is laid off as ordinates in micrometers. The abscissa 0 corresponds to the start of the photonic fibre, that is the point of coupling with the fibre 16 on FIG. 2. At this location, the fibre has an monomode core mode diameter of 10 micrometers which corresponds to the core diameter of a cladded core fibre in the prior art. The diameter of the multimode core is about 130 micrometers. The tapered or conical portion 14 extends between the abscissa 0 and the abscissa x1, the latter possibly having a value of about 2 m. At this abscissa, the non-stretched photonic fibre has a monomode core mode diameter of 30 micrometers and a multimode core diameter of 400 micrometers. Between the abscissae x1 and x2, the photonic fibre has a constant diameter. This portion corresponds in FIG. 2 to the location of coupling of the multimode fibres to the photonic fibre, the length x2−x1 being the length required for the lateral coupling of the multimode fibres, possibly reaching about 2 to 3 meters. In an example where the photonic fibre is used as an amplifying fibre, this length would be much larger. The tapered or conical portion 12 extends between the abscissa x2 and the abscissa x3 over a length of about 2 m. The mode diameter of the monomode core at the outlet is about 7 micrometers and the diameter of the multimode core is about 100 micrometers. These values correspond to those of a conventional double cladding fibre.

The graphs of FIGS. 3 and 4 show that, as regards the entire length of the coupler, the photonic fibre has a mode diameter greater than or equal to a value of 7 micrometers. More specifically, in the first tapered portion 14 between the abscissae 0 and x1, the mode diameter increases. It reaches the value of 100 micrometers in the non-tapered portion of the fibre between the abscissae x1 and x2. The mode diameter then decreases in the portion 12 of the coupler. For the signal transmitted, the fibre remains monomode over the entire length of the coupler. By way of comparison, in the device of the document EP-A-0 893 862, the mode diameter has a nominal value of 10 micrometers at the extremities of the coupler, but decreases to 7.5 micrometers inside the coupler.

The invention is described above in a preferred embodiment and a large number of variants are possible. In particular, it is possible to change the parameters defining the photonic fibre or the multimode fibres. So as to inject the pump light, it is possible to use fibres other than multimode fibres. The coupler can be used for applications other than the amplifier or laser applications described. In the amplifier examples, a double cladding amplification optical fibre has been mentioned and it is also possible to use a multiple cladding optical fibre or a photonic optical fibre of the type described in the French patent application 01 03640 of the Applicant. In the examples, a mono-directional system has been considered and a bi-directional system is also possible. Mounting can be symmetrical with a coupler injecting the signal or pumps at each extremity of the laser cavity or of the amplifying fibre. It is also possible to provide a sequential mounting with couplers injecting the pumps in a same given direction of propagation in successive fibre sections forming a laser cavity or an amplifying fibre.

What is claimed is:

1. Optical coupler having:
   a photonic optical fibre having a stretched portion;
   at least one multimode optical fibre coupled to the photonic optical fibre.

2. The coupler of claim 1, wherein the photonic optical fibre is at the centre of the assembly with the multimode optical fibres.

3. The coupler of claim 1, wherein the photonic optical fibre is assembled with the multimode optical fibre(s) by means of melting and stretching.

4. The coupler of claim 1, wherein the photonic optical fibre is assembled with the multimode optical fibre(s) outside the stretched portion.

5. The coupler of claim 1, wherein the photonic fibre is an amplifying fibre.

6. The coupler of claim 1, wherein the photonic fibre is a multimode fibre.

7. The coupler of claim 6, wherein the photonic fibre has in a non-stretched state a multimode core diameter greater than or equal to 100 micrometers.

8. The coupler of claim 1, wherein the photonic fibre is a double cladding fibre.

9. The coupler of claim 8, wherein the photonic fibre has in a non-stretched state a multimode core diameter greater than or equal to 100 micrometers.

10. The coupler of claim 8, wherein the photonic fibre has in a non-stretched state a mode diameter for the monomode core greater than or equal to 15 micrometers.

11. The coupler of claim 8, wherein the photonic optical fibre has a second portion stretched at its extremity opposite the stretched portion.

12. A fibre laser having:
    a coupler having a multimode photonic optical fibre having a stretched portion and at least one multimode optical fibre coupled to the photonic optical fibre a laser cavity formed of an optical fibre connected to the stretched extremity of the photonic fibre of the coupler;

at least one multimode pump connected at the inlet of a multimode optical fibre of the coupler.

13. The laser of claim 12, wherein the difference between the diameter of the multimode core of the photonic fibre and the diameter of the multimode core of the laser cavity is less than or equal to 5%.

14. An optical amplifier having a coupler having a double cladding photonic optical fibre having a stretched portion and at least one multimode optical fibre coupled to the photonic optical fibre;

a multiple cladding amplifying optical fibre coupled to the stretched extremity of the coupler.

15. The amplifier of claim 14, wherein the difference between the mode diameter of the monomode core of the multiple cladding optical fibre and the mode diameter of the monomode core of the photonic fibre is less than or equal to 5%.

16. The amplifier of claim 14, wherein the difference between the diameter of the multimode core of the multiple cladding optical fibre and the diameter of the multimode core of the photonic fibre is less than or equal to 5%.

17. The amplifier of claim 14, wherein it has a second coupler having a double cladding photonic optical fibre having a stretched portion and at least one multimode optical fibre coupled to the photonic optical fibre, the extremity of the multiple cladding fibre opposite the first coupler being coupled to the stretched extremity of the second coupler.

* * * * *